No. 818,913. PATENTED APR. 24, 1906.
L. PAYNE.
NUT LOCK.
APPLICATION FILED OCT. 30, 1903.
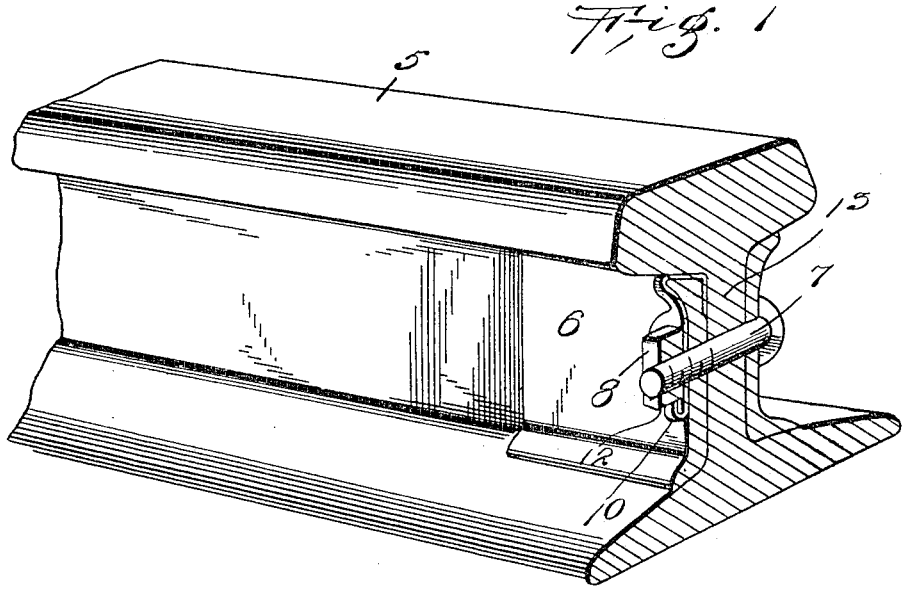
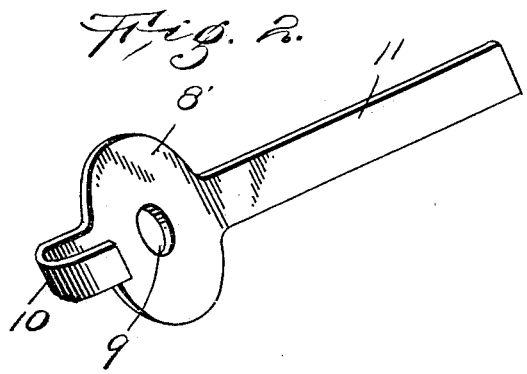
Witnesses
Inventor
L. Payne
By
Attorneys

UNITED STATES PATENT OFFICE.

LEWIS PAYNE, OF ELGIN, TEXAS.

NUT-LOCK.

No. 818,913.　　　　Specification of Letters Patent.　　　Patented April 24, 1906.

Application filed October 30, 1903. Serial No. 179,156.

*To all whom it may concern:*

Be it known that I, LEWIS PAYNE, a citizen of the United States, residing at Elgin, in the county of Bastrop, State of Texas, have invented certain new and useful Improvements in Nut-Locks; and I do hereby declare the following to be a full, clear, and exact description of the invention, such as will enable others skilled in the art to which it appertains to make and use the same.

This invention relates to nut-locks; and it has for its object to provide a lock which will serve to hold the nut securely against rotation in either direction, which will be cheap and easy of manufacture, and which may be easily and quickly applied and removed.

A further object of the invention is to provide a lock which will be held securely against rotation upon the bolt on which the nut is screwed.

In the drawings forming a portion of this specification, and in which like numerals of reference indicate similar parts in both views, Figure 1 is a sectional perspective view showing a railroad-rail and fish-plate with the lock applied to a nut on a fish-plate bolt. Fig. 2 is a perspective view of the lock shown in Fig. 1.

Referring now to the drawings, and more particularly to Figs. 1 and 2 thereof, there is shown a portion of a railroad-rail 5, having applied thereto a fish-plate 6, and through the rail and fish-plate is passed an ordinary form of bolt 7, provided with a common form of nut 8, which is to be held from backing off from the bolt.

To hold the nut upon the bolt, a lock is provided which consists of a central body portion 8', which may be of disk shape, as shown, and having an opening 9 therethrough, which receives the bolt, this lock being applied to the bolt prior to application of the nut.

At diametrically opposite points of the body portion radiate arms 10 and 11, the material of the lock being of sufficient flexibility to permit of bending of the shorter arm 10 upon itself, so that the end edge of said arm will rest against a side face of the nut 12, which has been screwed upon the bolt, this engagement of the end of the arm with the nut serving to prevent rotation of the nut upon the bolt.

In the process of application of the lock to the bolt and before the nut is screwed into place the arm 11 of the lock has its end portion bent backwardly and downwardly upon itself, engaged between the fish-plate and the web 13 of the rail. When the nut is screwed up to clamp the fish-plate tight against the rail, the arm 11 is held tightly between the fish-plate and rail, so that the lock cannot rotate upon the bolt, this absence of rotation of the lock being of course essential to the effectiveness of the lock.

When it is desired to remove the nut, the finger 10 is straightened or moved from its active position, above described, and the nut may be then rotated upon the bolt. When the fish-plate has been loosened from the rail, the end of the arm 11 may be drawn from between the fish-plate and the rail.

What is claimed is—

The combination with a rail, a fish-plate, a bolt and a nut, of a washer-plate located on said bolt between said nut and said fish-plate, said washer-plate having a major and a minor tongue, said major tongue being bent back over said fish-plate to lie between the same and the said rail and said minor tongue being extended downwardly and then back upon itself and having its end in engagement with one of the faces of said nut, the bent-back portion of said minor finger lying in parallel relation with the downwardly-extending portion thereof and in spaced relation thereto.

In testimony whereof I affix my signature in presence of two witnesses.

LEWIS PAYNE.

Witnesses:
　A. G. SOWELL,
　W. T. SOWELL.